United States Patent [19]

Seveso et al.

[11] Patent Number: 4,805,392
[45] Date of Patent: Feb. 21, 1989

[54] OPTICAL FIBER CABLE MANUFACTURING APPARATUS

[75] Inventors: Cesare Seveso, Cinisello Balsamo; Luigi Lucchini, Capriate San Gervasio, both of Italy

[73] Assignee: Societa' Cavi Pirelli S.p.A., Milan, Italy

[21] Appl. No.: 162,732

[22] Filed: Mar. 1, 1988

[30] Foreign Application Priority Data

Mar. 2, 1987 [IT] Italy .................... 19542 A/87

[51] Int. Cl.⁴ .................... G02B 6/16; G02B 6/44; H01B 13/02
[52] U.S. Cl. .................... 57/6; 57/9; 57/13; 57/264
[58] Field of Search .................... 57/3, 6, 9, 13–15, 57/19, 80, 81, 352, 264; 226/10, 24

[56] References Cited

U.S. PATENT DOCUMENTS

| | | | |
|---|---|---|---|
| 4,237,687 | 12/1980 | Vecchis et al. | 57/352 X |
| 4,309,864 | 1/1982 | Hulin | 57/6 |
| 4,446,686 | 5/1984 | Panuska et al. | 57/6 |
| 4,483,134 | 11/1984 | McKay et al. | 57/352 X |
| 4,497,164 | 2/1985 | Dotti et al. | 57/6 |
| 4,620,412 | 11/1986 | Portinari | 57/6 |

*Primary Examiner*—John Petrakes
*Attorney, Agent, or Firm*—Brooks Haidt Haffner & Delahunty

[57] ABSTRACT

In the manufacture of an optical fiber cable in which optical fibers are paid out from supply bobbins and inserted into the grooves of a core member by means of an inserting head, a photoelectric optical system is disposed between the supply bobbins and the inserting head to provide signals indicating the position of the optical fibers advancing from the supply bobbins. A control device is connected to the photoelectric system and is responsive to the signals generated therefrom to control the speed at which the optical fibers are paid off from the supply bobbins.

3 Claims, 2 Drawing Sheets

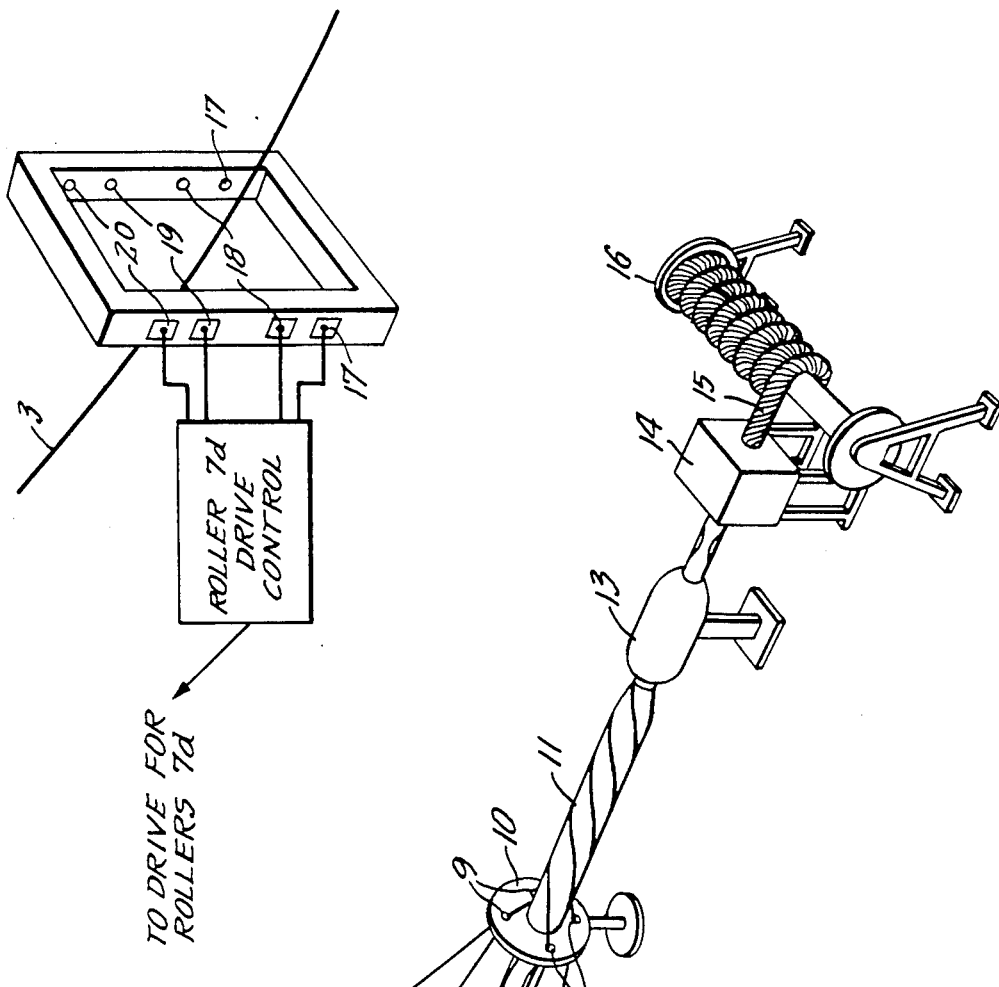
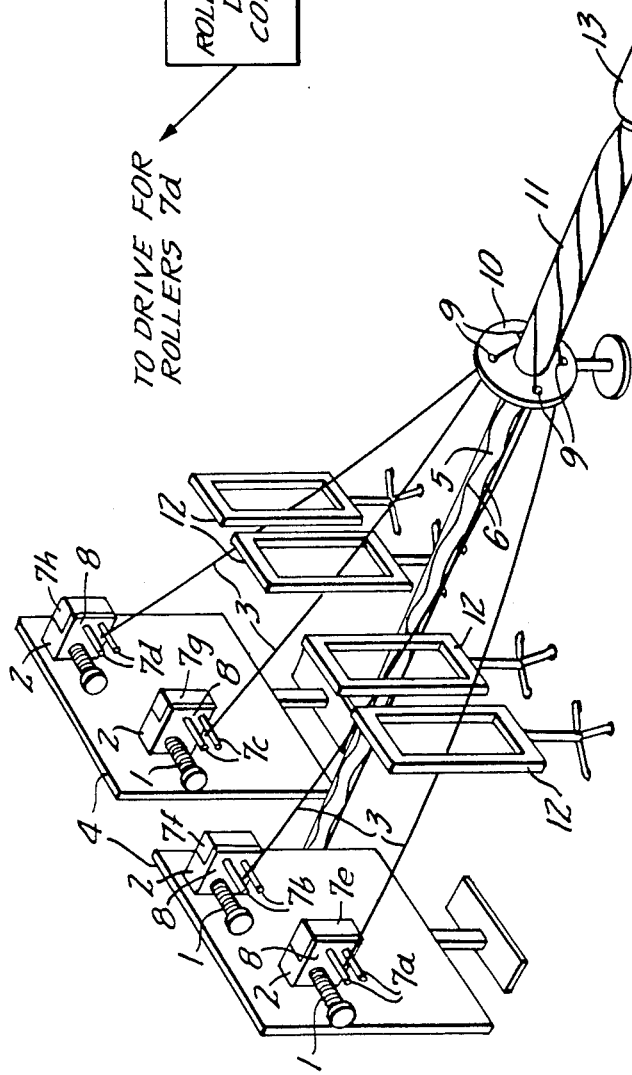

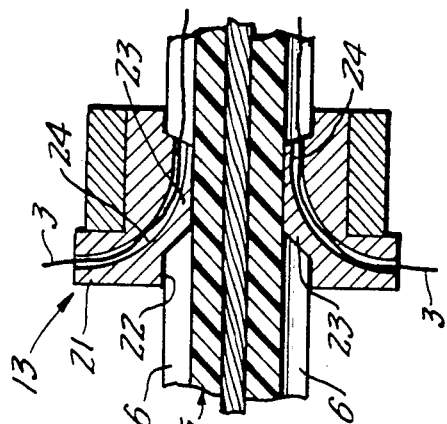
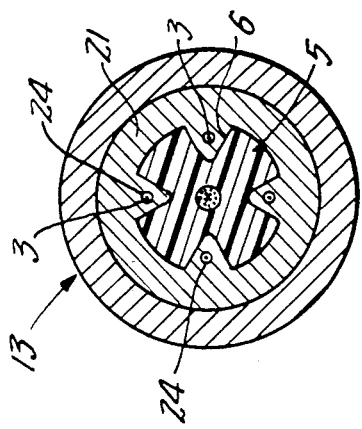
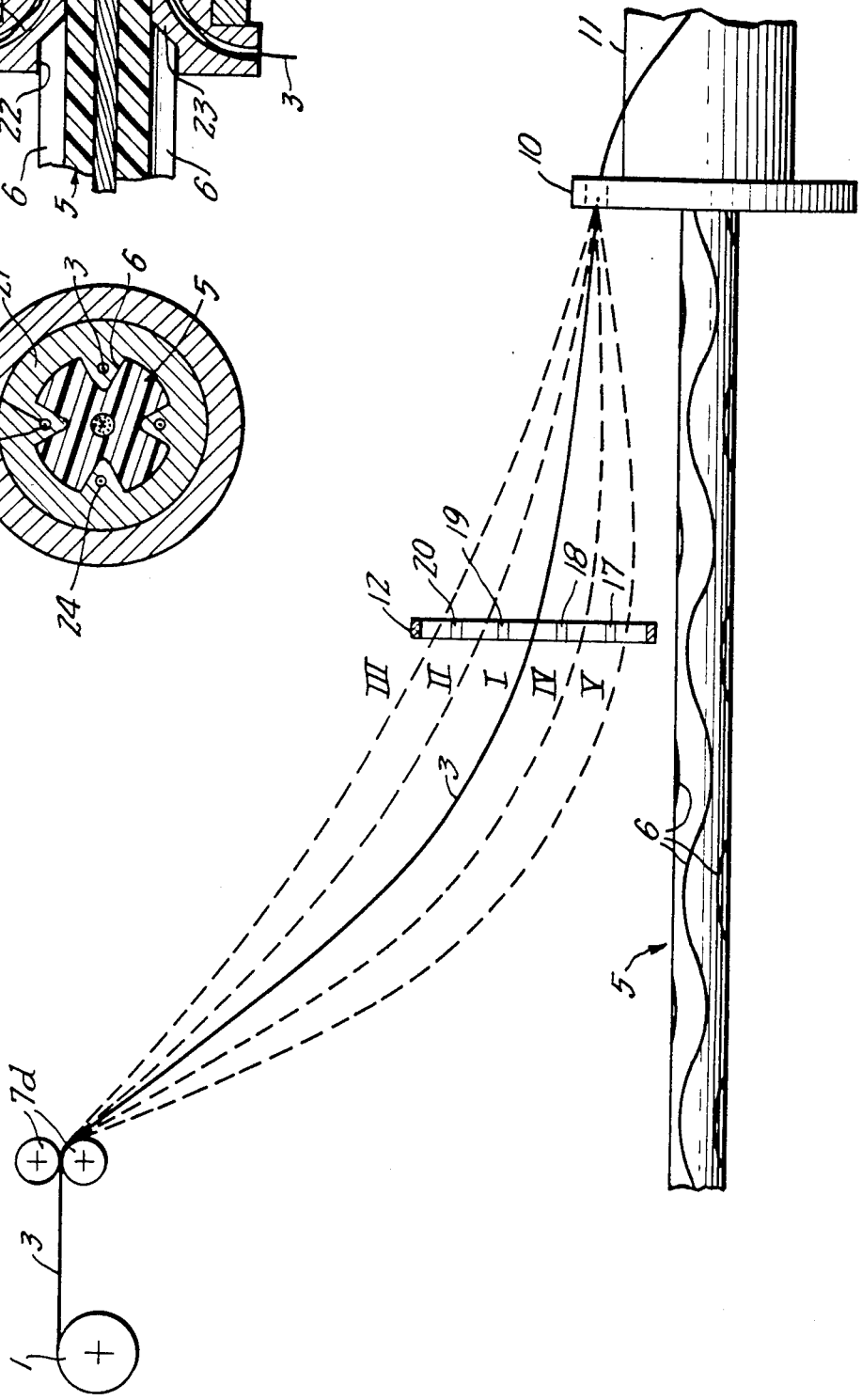

OPTICAL FIBER CABLE MANUFACTURING APPARATUS

The present invention relates to apparatus for the manufacture of optical fiber cables comprising a core, generally cylindrical, the outer surface of which has a plurality of grooves having an open helix path and each of which grooves loosely encases at least one optical fiber.

In the present specification, the expression "open helix" refers to the path of the grooves, and means that they are formed by Z-shaped or S-shaped alternate portions.

The core provided with grooves is generally, but not necessarily, made of a plastic material, and in this case, the core contains at least a tension and compression resistant element.

The core with the optical fibers is, moreover, provided with a covering, formed, for instance, by an extruded layer of plastic material or with a winding of one or more tapes which can be made of plastic material, the covering closing the outer ends of the grooves and protecting the optical fibers contained therein.

Apparatus of various types intended for the manufacture of cables comprising optical fibers, in which the cores are provided with grooves having an open helix path, are already known.

In conventional apparatus of a first type such as the apparatus described in the European patent application No. 20189. comprises a rotary frame supporting the coils of fibers from which the optical fibers are payed off to the grooves of the core of the cable being produced which moves forward rectilinearly. The insertion of the optical fibers in the grooves is obtained by virtue of a head which rotates around the core. A taping device, which closes the outer ends of the grooves outwardly, thus covering the core, is provided downstream of said head.

The frame is placed into rotation around the core by a motor associated with it while the head rotates, due to the rectilinear forward motion of the core, by virtue of extensions extending from a through cavity internal to the head and which engage with the grooves of the core. The extensions are provided with through holes for the passage of the optical fibers coming from the coils. To prevent microbendings and tension stresses which might be dangerous for the optical fibers, the rotation of the frame carrying the coils is adjusted in accordance with that of the head, eliminating, therefore, the stated macroscopic drawbacks.

However, as no control exists regarding the rotation of the coils around their own axes during the passage of the optical fibers from the coils to the head, there is still the risk that they may suffer such micro-bendings and tension stresses so that the necessary ample optical fiber in the grooves of the produced cable is not assured.

The already known apparatus of a second type, such as the apparatus described in the U.S. Pat. No. 4,620,412, comprises a fixed frame supporting the coils which pay off the optical fibers to be inserted in the cable core by means of a head identical to the one described hereinbefore.

Between the frame and the head, provision is made for a rigid tubular body into which passes the cable core and on the outer surface of which the optical fibers bear during their winding and unwinding. Also, this apparatus comprises a device, situated downstream of the head, which closes the grooves outwardly by means of a covering around the core. This second type of apparatus also has the disadvantages of the first type.

Said disadvantages lead to the manufacture of cables in which the signals to be transmitted may lose intensity as a consequence of micro-bendings suffered by the optical fibers during their insertion into the grooves.

Furthermore, as the sufficiency of optical fibers in the grooves is the more relevant the smaller the tension stress exerted onto them during insertion, the impossibility of reducing said tension stress to a pre-established value with the conventional apparatus may give rise to an insufficient length of optical fibers in said grooves which, during the laying of the cable produced, would involve the creation of tensions prejudicial to the intensity of signal transmission of said optical fibers.

The present invention has, as one object, the providing of apparatus for manufacturing cables comprising optical fibers, which does not have the disadvantages of the conventional apparatus and which is able to insert the optical fibers in the grooves of the cable core without imparting micro-bendings and with a tension stress smaller than a pre-established value in order to ensure a sufficient length of optical fibers in said grooves and consequently to prevent, during the cable laying, the generation of tensions prejudicial for said optical fibers.

In accordance with the present invention, there is provided an apparatus for manufacturing cables comprising optical fibers and of the type containing a core provided on its outer surface with at least a groove in the form of an open helix which receives at least one optical fiber, said apparatus comprising:

a plurality of bobbins carrying the optical fibers and which rotate about their own axes and which are mounted on a fixed frame;

a head to insert the optical fibers in the grooves of the core which is provided with a through cavity for the passage of the core and with a plurality of extensions to be inserted in the core grooves and extending from the wall of said through cavity, the extensions each having a through hole for the passage of the optical fibers;

a rigid tubular body interposed between the coil-holding frame and the head, which permits the passage of the cable core and which supports the optical fibers on its outer surface; and a mechanism for the rectilinear advancement of the core and causing alternative rotatory movement of said head, the apparatus being characterized by the fact of comprising:

a first and a second optical system for each optical fiber, respectively situated in the upper and in the lower part of a fixed frame through which each individual optical fiber having a catenary configuration passes, the first optical system comprising at least one photoelectric cell system arranged transversely to the direction of advancement of the optical fiber and intended to provide signals determining an increase in the speed of the mechanism paying off the optical fiber, the second optical system comprising at least one photoelectric cell system arranged transversely to the direction of advancement of the optical fiber and intended to provide signals determining a decrease in the speed of the mechanism paying off the optical fiber, the axial plane containing the catenary configuration of the optical fiber intersecting the light received by the photoelectric cells.

In a preferred embodiment of an apparatus according to the invention, both the first and the second optical systems comprise two photoelectric cells. In this case, the photoelectric cells of the two optical systems which are the farthest from each other issue signals determine, respectively, the fixed increase and decrease in the speed of the mechanism paying off the optical fibers, whereas, the photoelectric cells of the two optical systems which are the nearest to each other have the double function of providing signals determining respectively a temporary increase and decrease in the speed of the mechanism paying off the optical fibers and the cessation of the signals provided by the photoelectric cells of the two optical systems which are the farthest from each other.

Other objects and advantages of the present invention will be apparent from the following detailed description of the presently preferred embodiments thereof, which description should be considered in conjunction with the accompanying drawings in which:

FIG. 1 is a schematic perspective view of the preferred embodiment of the invention;

FIG. 2 is an enlarged perspective view of a frame shown in FIG. 1;

FIGS. 3a and 3b are, respectively, enlarged transverse and longitudinal cross sections of the fiber insertion head shown in FIG. 1; and FIG. 4 is a side elevation diagram used to illustrate the operation of the apparatus of the invention. An apparatus of the invention will now be described with reference to FIG. 1.

A plurality of bobbins or spools 1, provided with braking devices 2 and carrying optical fibers 3, are supported by fixed frames 4 between which passes, with rectilinear motion, a core 5 provided with grooves 6 in the form of an open helix, the core 5 being payed off from a reel (not shown). The bobbins 1 are preferably situated above the grooved core 5. A mechanism for paying off the optical fibers 3 from the bobbins 1 comprises pairs of rollers 7a–7d, at least one of which is motor-driven, through which the optical fibers pass and are drawn from the bobbins 1. The rollers 7a–7d and the drivers 7e–7h therefor are supported by brackets 8 which also support the bobbins 1 and the braking devices 2 and are fastened to the frames 4.

Therefore, the optical fibers are free to take a configuration determined by their own weight from the time they leave the rollers 7a–7d until they pass through holes 9 in a flange 10 fixed on a rigid tubular body 11 through which the core 5 passes. Between the flange 10 and the head 13, the fibers 3 engage the outer surface of said body 11. In the area where they remain free, the optical fibers 3 take the configuration of catenary arcs and pass through frames 12, each of which includes first and second optical systems which, as described in detail hereinafter, detect the position of the optical fibers 3 and exert an appropriate control action on the speed of rollers 7a–7d.

The head 13, downstream the rigid tubular body 11, and more specifically described hereinafter, inserts the optical fibers 3 into the grooves 6 of the core 5.

Beyond the head 13 in the direction of advancement of said core 5, there is a taping device 14 which winds a tape, for example, a tape of elastomeric material, around the core 5 and closes the outer ends of the grooves 6 having the optical fibers 3 therein. The apparatus also comprises a mechanism for causing the rectilinear advancement of the core 5 and comprises a motor-driven reel 16, which also takes up the cable 15 in its final form.

FIG. 2 represents in enlarged scale one of the frames 12, the frame 12 associated with the optical fiber 3 supplied from the rollers 7d. The other frames 12 are similarly constructed and similarly respectively control the speed of the rollers 7a–7c.

The frame 12 shown in FIG. 2 is of rectangular shape, and in steady condition, an optical fiber 3 passes through the central portion of the frame 12. The upper part of said frame contains the first optical system comprising the photoelectric cells and light sources 19 and 20, whereas the lower part contains the second optical system comprising the photoelectric cells and light sources 17 and 18. All the light beams directed on the photoelectric cells are parallel and above one another, and the light beams intersect the plane containing the catenary configuration of the optical fiber. A conventional electric drive control 25 is connected to the photoelectric cells of the optical systems and which receives the signals supplied by the optical systems and transforms them, as will be further explained, into control signals which are supplied to the drive 7h to vary the speed of rollers 7d, shown in FIG. 1, of the mechanism which pays off an optical fiber 3 from a bobbin 1.

As previously stated, downstream the rigid tubular body 11 there is a head 13, used to insert the optical fibers 3 in the core grooves 6. The head 13 is shown in greater detail in FIGS. 3a and 3b and is of a known type. The head 13 comprises a rigid body 21 provided with a through opening 22 from the wall of which a plurality of extensions 23 extend. Such extensions 23 couple with the grooves 6 of the core 5.

In addition, the rigid body 21 and the extensions 23 have channels or ducts 24 therethrough to allow the passage of the optical fibers 3.

The core 5 advances with a rectilinear motion due to the drawing action exerted by the motor-driven reel 16, and its grooves 6 are coupled to the extensions 23 (see FIG. 3b) of the head 13. At the same time, the optical fibers 3 are payed off from the bobbins 1 by virtue of the rollers 7a–7d of the paying off mechanism and are supplied to the ducts 24 (see FIG. 3b) of the head 13.

The open helix grooves 6 cause an alternate rotary motion of the head 13, which is followed by the optical fibers coming from fixed bobbins 1 so that said fibers 3 are taken up on and payed off from the outer surface of the rigid tubular body 11.

In the apparatus, the mechanism used to advance the core 5, constituted by the motor-driven reel 16, and the mechanism used to pay off the optical fibers from the bobbins 1, constituted by rollers 7a–7d, have separate driving systems, the operation speeds of which can be different from each other and thereby, are able to ensure that, in the time interval in which the core 5 advances by a certain length, the optical fibers 3 are payed off in an amount which is longer than the theoretical length of the grooves 6 in which they are received. Actually, however, neither the development of groove 6 is regular, nor the speeds of the mechanisms are strictly constant. Therefore, the catenary configurations assumed by the optical fibers 3 in the portion between the rollers 7a–7d and the flange 10, when the fibers pass in steady condition through the central part of frames 12, will vary in consequence of these irregularities, deviating from the positions which ensure the correct insertion of the optical fibers 3 into the grooves 6 which is indicated with the reference letter I in FIG. 4.

FIG. 4 illustrates the operation of the optical system on a frame 12, e.g. the frame 12 associated with the rollers 7d. The optical systems on the frame 12 control the catenary configuration of an optical fiber 3 by means of signals supplied by the photoelectric cells which increase and/or decrease in the speed of rollers 7 so as to provide a catenary configuration corresponding substantially so that indicated with the reference I in order to eliminate all possible working irregularities.

In fact, it is possible to reduce the concavity of the catenary and to lift up the optical fiber, or to increase said concavity and to lower said fiber, by increasing or by decreasing, respectively, with respect to the steady condition the speed of rollers 7d, so that a greater or a smaller amount of optical fiber will be payed off from bobbin 1.

Consequently, if for any reason the optical fiber 3 is lifted up, taking configuration II in its passage before photoelectric cell of the system 19, the latter transmits to the drive 7h of the rollers 7d a signal causing a temporary increase of the speed thereof. If, in spite of this, the optical fiber 3 continues to lift up and take the configuration III, its passage before the photoelectric cell of the system 20 causes transmission to drive 7h of the rollers 7d of a signal causing a permanent increase of the speed thereof.

Owing to this, the optical fiber 3 lowers to take the configuration I and passes before the photoelectric cell of the system 19 which discontinues the permanent increase of speed imparted to rollers 7d by the photoelectric cell of the system 20.

On the other hand, if for any reason the optical fiber 3 lowers, taking configuration IV in its passage before the photoelectric cell of the system 18, the latter transmits to the drive for the rollers 7d a signal causing a temporary decrease of the speed thereof. If, in spite of this, the optical fiber continues lowering to take configuration V, then, the passage of the fiber before the photoelectric cell of the system 17 causes the transmission to the drive for the rollers 7d of a signal causing a permanent decrease of the speed thereof. Owing to this latter control, the optical fiber lifts up again, taking configuration I, and its passage before the photoelectric cell of the system 18 discontinues the permanent decrease of speed imparted to rollers 7d by the photoelectric cell of the system 17.

Although only the control of the paying out of an optical fiber 3 by the rollers 7d has been described, it will be understood that the paying out of the fibers 3 by the rollers 7a–7c is similarly controlled.

From the above description and from the following considerations, it will be understood that the present invention is able to achieve the proposed goals.

A pre-established catenary configuration, with a pre-determined curvature of the optical fibers where they are not supported or guided before their insertion in the core of the cable to be produced, is imparted and maintained in the apparatus during its operation. Consequently, any risk for the optical fibers to be subjected to prejudicial curvatures, in particular, to micro-bendings, inside the apparatus, is eliminated.

Further, if it is considered that each catenary configuration taken by an optical fiber involves a well defined tension stress existing therein, it is possible to deduce the following: In an apparatus according to the invention, the tension stresses imparted to the optical fibers are limited to pre-established values corresponding to the particular catenary configuration imparted to them. Therefore, said values can be selected in such a way as to ensure an ample amount of optical fibers in the grooves of the produced cabls which avoids the generation of tensions harmful for the optical fibers during the laying operation.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. In apparatus for manufacturing an optical fiber cable comprising a core with grooves, each groove receiving at least one optical fiber, said apparatus comprising a plurality of bobbins rotatable around respective axes and for carrying the optical fibers to be inserted into said grooves, means for advancing said core, a rotatable optical fiber inserting head spaced from said bobbins in the direction of advance of said core, said head having a passageway for the passage of said core therethrough and having extensions insertable in said grooves and a rigid tubular body intermediate said bobbins and said head, said body having a passageway therethrough for the passage of said core and having one end thereof spaced from said bobbins and the opposite end thereof adjacent said head, the improvement comprising intermediate each of said bobbins and said one end of rigid tubular body;

paying off means for removing optical fiber from a bobbin and advancing the optical fiber toward said one end of said rigid tubular body;

means for driving said paying off means;

first and second optical systems disposed intermediate the bobbin from which the optical fiber is removed and said one end of said rigid tubular body, said first optical system being disposed above said second optical system and each said optical systems comprising at least one light means for directing light energy transversely to the plane of the path of the optical fiber from said bobbin to said one end of said rigid tubular body and at least one photoelectric cell disposed adjacent said path at the opposite side thereof from said light means for providing signals indicating the position of the optical fiber; and controlling means for controlling the speed of said paying off means connected to each said photoelectric cell and responsive to said signals for varying the speed at which said paying off means removes optical fiber from a bobbin dependent upon the position of the optical fiber as it passes from said paying off means to said end of said rigid tubular member.

2. Apparatus as set forth in claim 1 wherein each of said optical systems comprises at least two light means and at least two photoelectric cells disposed one above the other and wherein said controlling means respectively increases and decreases the speed of said paying off means to a fixed value in response to signals from respectively the uppermost and lowermost photoelectric cells and discontinues the speed of said paying off means at said fixed value when it subsequently receives signals from one of the intermediate photoelectric cells.

3. Apparatus as set forth in claim 1 wherein said paying off means comprises a plurality of rollers, one pair for each of said bobbins disposed adjacent a respective bobbin, and further comprising braking means connected to each said bobbin for retarding the rotation thereof.

* * * * *